US006228980B1

(12) United States Patent
Loontjens et al.

(10) Patent No.: US 6,228,980 B1
(45) Date of Patent: May 8, 2001

(54) HIGH-MOLECULAR POLYAMIDE

(75) Inventors: Jacobus A. Loontjens; Bartholomeus J. M. Plum, both of Meerssen (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/421,525

(22) Filed: Oct. 20, 1999

Related U.S. Application Data

(63) Continuation of application No. PCT/NL98/00217, filed on Apr. 20, 1998.

(30) Foreign Application Priority Data

Apr. 22, 1997 (NL) .................................................. 1005866

(51) Int. Cl.[7] ........................ C08G 69/14; C08G 69/16; C08F 8/00
(52) U.S. Cl. ........................ 528/480; 528/486; 528/491; 528/492; 528/310; 528/323; 528/272
(58) Field of Search .................................... 528/310, 323, 528/272, 480, 486, 491, 492

(56) References Cited

FOREIGN PATENT DOCUMENTS

| 0117433 A1 | 9/1984 | (EP) . |
| 0288253 A2 | 10/1988 | (EP) . |
| 1533650 | 11/1978 | (GB) . |
| WO 96/34909 | 11/1996 | (WO) . |

OTHER PUBLICATIONS

Patent Abstract of Japan, vol. 013 No. 494 Nov. 8, 1989.
Patent Abstract of Japan vol. 013 No. 569 Dec. 15, 1989.
Patent Abstract of Japan JP–42–17832A, 8/1967.

*Primary Examiner*—P. Hampton-Hightower
(74) *Attorney, Agent, or Firm*—Pillsbury Winthrop LLP

(57) ABSTRACT

The invention relates to a process for preparing a high-molecular polyamide or polyester by melt-mixing polyamide or polyester having a lower molecular weight with a carbonyl bislactam having formula 1, in which n=an integer of between 3 and 15. With the process according to the invention a permanent increase in the molecular weight of a polyamide is obtained within 2 minutes, whereas this takes at least 10 minutes under comparable conditions using a bislactam according to the state of the art.

11 Claims, No Drawings

HIGH-MOLECULAR POLYAMIDE

This Application is a Continuation of PCT/NL98/00217 filed Apr. 20, 1998.

The invention relates to a process for preparing a high-molecular polyamide, polyester or polyester-amide block copolymer by melt-mixing polyamide or a polyester or a mixture of a polyamide and a polyester having a lower molecular weight with a bislactam.

BACKGROUND

Such a process is for example known from EP-A-0288253, in which, as in other publications, use is made of bis-N-acyl lactams having the formula:

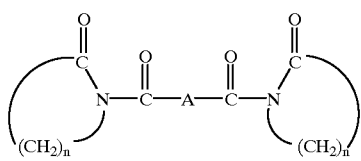

in which A=alkyl or an aromatic group and n is generally between 3 and 11.

The bis-N-acyl lactams used in the examples are generally tere- or isophthaloyl bislaurocaprolactam or biscaprolactam.

These bis-N-acyl lactams however have the drawback of a relatively low reaction rate, as a result of which long reaction times are required to realize the desired increase in molecular weight, which may lead to undesired side-reactions, e.g. discolouration of the polyamide or polyester.

In practice, bisoxazolines or bisoxazines are therefore more preferably used as chain extenders for polyamides. The drawback of these is however that they react with the polyamide's carboxylic end groups, as a result of which the polyamide obtained contains excess amino end groups and the polyester excess hydroxyl endgroups, which adversely affects the thermal oxidative stability.

FIELD OF THE INVENTION

The invention's aim is hence a process in which a bifunctional chain extender that does not involve the above drawbacks is added to a polyamide or a polyester melt.

SUMMARY OF THE INVENTION

The inventors have now most surprisingly found that when the polyamide or the polyester having the lower molecular weight reacts in the melt with a carbonyl bislactam, a colourless, stable polyamide or polyester with increased molecular weight is very quickly obtained.

DETAILED DESCRIPTION OF INVENTION

'Carbonyl bislactam' is understood to be a compound having the formula:

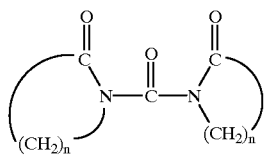

in which n is an integer of between 3 and 15. Preferably n=5 to 12.

The carbonyl bislactam can be obtained in a simple manner through reaction of the lactam with phosgene, $COCl_2$. The preparation of N,N'-carbonyl biscaprolactam via this route in benzene in the presence of a tertiary alkylamine as a catalyst is for example described in JP-A-42017832.

The amount of carbonyl bislactam used in the process according to the invention may vary within a wide range. Usually at least about 0.1 wt. %, relative to the polyamide or the polyester, will be required to obtain an appreciable effect. Amounts of more than 4 wt. % do not usually lead to a further increase in the molecular weight.

Usually a person skilled in the art will adjust the amount of carbonyl bislactam to be used to the number of amino or hydroxyl end groups available and the increase in viscosity to be realized as a result of the increased molecular weight. He will usually determine the optimum amount for his situation through simple experimentation.

In principle, the process of the invention can be used for all types of polyamides and polyesters. The polyamides include at least the aliphatic polyamides, for example polyamide-4, polyamide-6, polyamide-8 etc., polyamide-4,6, polyamide-6,6, polyamide-6,10, etc., polyamides derived from an aliphatic diamine and an aromatic dicarboxylic acid, for example polyamide-4,T, polyamide-6,T, polyamide-4,I, etc., in which T stands for terephthalate and I for isophthalate, copolyamides of linear polyamides and copolyamides of an aliphatic and a partially aromatic polyamide, for example 6/6,T, 6/6,6/6,T, etc. The process is particularly advantageous in the case of partially aromatic polyamides and copolyamides that require in general a relatively long polymerisation time.

The polyesters include at least polyesters derived from aliphatic dicarboxylic acids and diols, polyesters from aliphatic diols and aromatic dicarboxylic acids, copolyesters that are partially aliphatic and partially aromatic and polyesters that contain units derived from cycloaliphatic dicarboxylic acids. Specific examples are polybutyleen adipaat, polyethyleen terephtalate, polyethyleen naphtalate, polybutyleenterephtalate, copolyesters of polybutyleenadipate and polybutyleenterephtalate, the polyester derived from butanediol and cyclohexane dicarboxylic acid.

The process according to the invention can be carried out in a simple manner using the usual melt-mixing techniques and equipment, for example by dry blending the polyamide or polyester having a lower molecular weight and the bislactam and optionally also other additives in a solid state, for example in a tumbler drier, after which the mixture obtained is melted in a usual melt-mixing apparatus, for example a Haake kneader, a Brabender mixer or a single- or double-screw extruder. The different components can also be fed to the mixing apparatus separately.

Best results are obtained if the lower molecular polyamide or polyester are thoroughly dried.

Preferably the carbonyl bislactam is added to the melted polyamide or polyester product stream in the polymerisation process as it leaves the polymerisation reactor. The polymerisation process can be carried out both batchwise or in a continuous mode. In the first case a reduction of the residence time in the reactor can be realized and thus an increase in productivity; with the continuous process the after-condensation step, that is necessary usually to obtain a polyamide or polyester of sufficient molecular weight can be avoided.

EXAMPLES

The invention will now be elucidated with reference to the following examples, without however being limited thereto.

Materials Used a.1. polyamide-6 having a $\eta_{rel}=2.56$ measured in formic acid and a concentration of end groups —COOH=0.052 meq/g —NH$_2$=0.052 meq/g.

a.2. polyethylene terephtalate, PET, having a $\eta_{rel}=1,44$, measured in m-cresol b.1. carbonyl biscaprolactam (CBC); from Isochem, France.

b.2. N,N'-isophthaloyl biscaprolactam (IBC): from DSM RIM NYLON, the Netherlands.

c. 1,3 phenylene bisoxazoline (1.3 PBO): from Takeda Chemicals, Japan.

Process

The polyamide was melted in a Brabender mixer, type Plasticorder 651, at 240° C. until a constant torque of the kneaders was obtained, after which the bislactam was added and the mixing was continued. The kneaders' torque was measured at different times. The mixing was carried out at a rotational speed of the kneaders of 30 rotations per minute, under a nitrogen blanket to prevent the risk of the polyamide decomposing as a result of oxidation.

Table 1 shows the compositions investigated and the results of the measurements.

The results of Experiments 2 vs. 4 show the surprisingly high activity of the carbonyl lactam, as a result of which a stable high value of the melt viscosity (expressed as the Brabender mixer's moment of couple) was obtained after 2 minutes already, whereas this is not the case when use is made of the bislactam according to the state of the art.

Thanks to this short reaction time, which is of the same order as the residence time in a normal extrusion, a stable, increased melt viscosity can be realized in practice, and the molecular weight of polyamide can be increased, using only a bislactam.

The relative viscosity, measured in a solution of 1 gram in 100 ml of 90 wt. % formic acid, shows the same development as the measured moments of couple after 10 minutes.

TABLE 1

| Experiment | 1 | 2 | 3 | 4 | 5 | 6 |
|---|---|---|---|---|---|---|
| Composition (parts by weight) | | | | | | |
| a.1. | 100 | 100 | 100 | 100 | 100 | 100 |
| b.1. * CBC | | 0.666 | 0.666 | | | |
| b.2. * IBC | | | | 0.940 | | 0.940 |
| c. * PBO | | | 0.570 | | 0.570 | 0.570 |
| Kneader couple-moment (Nm) | | | | | | |
| 2 min. | 6.0 | 9.5 | 10.5 | 7.0 | 6.0 | 8.4 |
| 4 min. | 6.0 | 9.5 | 13.5 | 7.2 | 7.5 | 10.5 |
| 6 min. | 6.0 | 9.5 | 16.5 | 8.5 | 8.5 | 11.5 |
| 10 min. | 6.0 | 9.5 | 19.5 | 8.4 | 10.5 | 13.0 |
| relative viscosity (10 min.) in formic acid | 2.6 | 2.9 | 3.9 | 2.7 | 2.9 | 3.2 |

* the quantity
b resp.
c was chosen equivalent to the number of amino resp. carboxyl endgroups available in the polyamide.

The process of the foregoing experiments was repeated however with polyethylene terephtalate having a solution viscosity of 1.44 in m-cresol. The temperature was set at 280° C. Compositions and results are given in Table 2.

TABLE 2

| Experiment | 7 | 8 | 9 | 10 | 11 | 12 |
|---|---|---|---|---|---|---|
| Composition (parts by weight) | | | | | | |
| a.2. | 100 | 100 | 100 | 100 | 100 | 100 |
| b.1. CBC ** | | | | 0.96 | | 0.96 |
| b.2. IBC ** | | | 1.35 | | 1.35 | |
| c. PBO ** | | 0.27 | | | 0.27 | 0.27 |
| Kneader couplemoment (Nm) | | | | | | |
| 2 min. | 0.5 | 1.0 | 1.5 | 1.5 | 2.0 | 1.5 |
| 4 min. | 0.5 | 1.0 | 2.0 | 2.0 | 2.5 | 2.0 |
| 6 min. | 0.5 | 1.0 | 2.5 | 2.0 | 3.5 | 2.5 |
| 10 min. | 0.5 | 1.0 | 2.5 | 2.5 | 4.5 | 2.S |
| relative viscosity (10 min.) in m-cresol 1 wt. %, 135° C. | 1.44 | 1.47 | 1.62 | 1.62 | 1.68 | 1.64 |

**) The quantity (b) resp. (c) was chosen equivalent to the number of hydroxyl resp. carboxyl end groups.

Analysis of the endgroups after 10 minutes meltmixing reveals for the compositions the following data:

TABLE 3

| Experiment | COOH— [meq/gram] | OH— [meq/gram] |
|---|---|---|
| 7 | 0.041 | 0.083 |
| 8 | 0.026 | 0.085 |
| 9 | 0.046 | 0.031 |
| 10 | 0.029 | 0.047 |
| 11 | 0.027 | 0.028 |
| 12 | 0.018 | 0.045 |

Apparently the carboxy biscaprolactam (CBC) is also reactive with the carboxyl endgroups. IBC reacts with the hydroxyl end groups only, and seems to be more effective. However also IBC shows to be effective for 50% only. For this reason the added quantities IBC and CBC were increased in a further experiment by 50%. Very surprisingly in this case CBC showed much more effectivity than IBC. Results are given in Table 4.

TABLE 4

| Experiment | —COOH meq/gram | $\eta_{rel}$ | remarks |
|---|---|---|---|
| 7 | 0.041 | 1.44 | |
| 9 * | 0.045 | 1.63 | |
| 13 | 0.045 | 1.69 | 2.03 pbw IBC |
| 10 * | 0.028 | 1.65 | |
| 14 | 0.021 | 1.77 | 1.44 pbw CBC |

* duplo experiments

Therefore CBC is used in polyesters preferably in excess of the equivalent quantity calculated on the basis of hydroxyl endgroups available in the lower molecular polyester of which the molecular weight should be increased.

The molecular weight of the polyamide or polyester having the lower molecular weight may vary over a wide range and is mainly determined by economical reasons and the source of the material. In general it may vary from about 1000 to about 20.000 expressed as number averaged molecular weight Mn. However situations are possible in which a mixture containing a polyamide or polyester of high molecular weight for instance 25.000 and an appreciable fraction oligomeric polyamide or polyester of molecular weight less than 1000 is reacted in the melt with the CBC according to the present invention.

The molecular weight of the high molecular weight polyamide or polyester to be produced by the process of the invention can be freely chosen and generally is higher than 15.000, preferably higher than 20.000, even more preferably higher than 25.000.

The polyamide or polyester obtained by the process of the invention can be processed by injection moulding, extrusion or blow moulding to obtain moulded articles, and by melt spinning to obtain fibres.

FORMULA SHEET

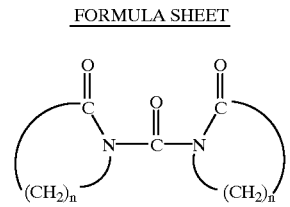

formula 1

What is claimed is:

1. A process for increasing the molecular weight of a polyamide or polyester comprising:
   melt-mixing the polyamide or polyester with a bislactam, wherein the bislactam is a carbonyl bislactam represented by the following formula:

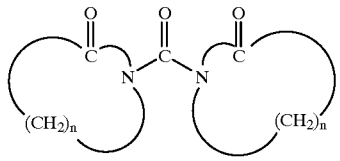

in which n represents an integer of between 3 and 15.

2. A process according to claim 1, wherein n represents an integer of 5 to 12.

3. A process of claim 1, wherein the polyamide or polyester is melt-mixed with 0.1 to 4 wt. % of the bislactam, relative to the polyamide or the polyester.

4. A process for increasing the molecular weight of a polyamide comprising:
   melt-mixing the polyamide with a bislactam, wherein the bislactam is a carbonyl bislactam represented by the following formula:

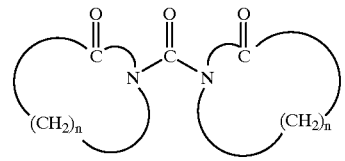

in which n represents an integer of between 3 and 15.

5. The process of claim 4, wherein the polyamide includes an aliphatic polyamide, aliphatic/aromatic polyamide and/or copolyamide of linear/aromatic polyamides.

6. The process of claim 5, wherein the aliphatic polyamide includes polyamide-4, polyamide-6, polyamide 8, polyamide-4,6, polyamide-6,6 and/or polyamide-6,10.

7. The process of claim 5, wherein the aliphatic/aromatic includes polyamide4,T, polyamide-6,T and/or polyamide-4, I.

8. The process of claim 5, wherein the copolyamide of linear/aromatic polyamides includes polyamide 6/6T and/or polyamide 6/6.

9. The process of claim 5, wherein the polyamide includes polyamide-6.

10. The process of claim 1, wherein the process further comprises dry blending the polyamide or polyester with the bislactam prior to the melt-mixing.

11. The process of claim 1, wherein the melt-mixing is conducted in a reactor and the bislactam is added to the polyamide or polyester exiting the reactor.

* * * * *